Oct. 13, 1942.    S. H. WEBSTER    2,298,523
AIRCRAFT CONTROL
Filed Oct. 21, 1940

Inventor
Sidney Webster.
By Martin J. Finnegan.
Attorney

Patented Oct. 13, 1942

2,298,523

UNITED STATES PATENT OFFICE 2,298,523

AIRCRAFT CONTROL

Sidney H. Webster, Bogota, N. J., assignor to Bendix Aviation Corporation, South Bend, Ind., a corporation of Delaware Application October 21, 1940, Serial No. 362,173

3 Claims. (Cl. 244—103)

This invention relates to aircraft appliances and particularly to appliances which facilitate smooth and safe landing of an aircraft.

The invention is herein shown as applied to an airplane of a type requiring tired-wheels as the ground contacting portion of the landing gear, but it is to be understood that in its broadest aspects this invention is applicable to any other type of aircraft having a landing gear.

The large tire of an airplane wheel takes severe punishment when the plane lands, due to the fact that it must, theoretically, assume a speed of rotation corresponding to the landing speed of the ship. The wheels, weighing in some cases six hundred pounds each, and having a large moment of inertia, are forced to slip for some time before reaching the proper speed, and the result is that large pieces of rubber are stripped or burned off the tire at each landing. This action is especially severe when landing on concrete runways.

An object of the present invention is to provide means to start the wheels rotating prior to landing, such that their speed is nearly proportional to the landing speed of the plane.

A second object is to provide means for gradual deceleration of the wheels, after first contact with the ground, to the end that the craft may be smoothly retarded as it moves along the ground; the wheels remaining in motion during such retardation, wherefore the wear and tear on the rubber is almost entirely eliminated.

A further object is to provide unitary means for doing both these jobs in proper sequence; that is, for starting the wheels (accelerating them to a speed consonant with that of the plane at the moment of contact) and for subsequently controlling the deceleration of said wheels, and thus controlling deceleration of the craft itself.

These and other objects will become apparent upon inspection of the following specification and the accompanying drawing, wherein is illustrated the preferred embodiment of the invention. It is to be expressly understood, however, that the drawing is intended merely to serve as an illustration of one mode of embodying the invention in a practical form and is not designed as a definition of the limits of the invention.

Figure 4:
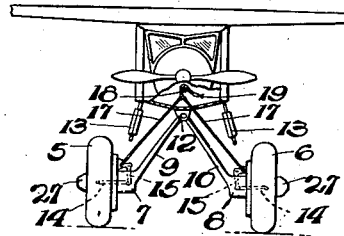
Fig. 4 is a diagram showing the invention applied to both wheels of a landing gear.

Referring to the drawing, the invention is shown embodied in a landing gear including a pair of rubber tired wheels 5 and 6 (Fig. 4) each of which is rotatable upon bearings 11 (Fig. 1) surrounding stationary tubes or axles 7 and 8, forming parts of diagonal braces 9 and 10, respectively; the latter being tied into the fuselage of the plane as indicated at 12, and through the usual shock-absorbing means, as indicated at 13. Extending through each tube or axle 7—8 is a rod 14, said rods being pivotally connected to the lower arms of associated bell cranks 15; and the other arms of the bell cranks being adapted to receive cables 17 wound about a pulley 18 and terminating in a handle 19 within reach of the operator of the craft, and serving when drawn taut by the operator to move the rods 14 outwardly through the wheels 5 and 6.

Figure 1:
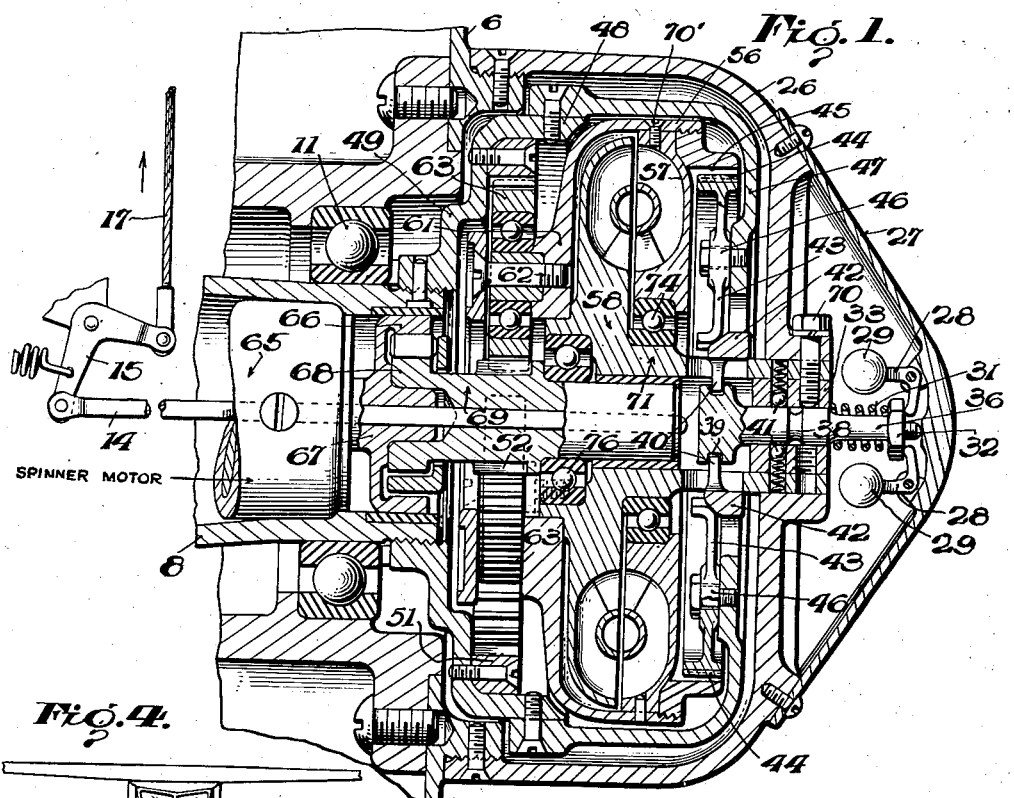
Fig. 1 is a vertical axial sectional view through the hub of one of the wheels of an aircraft landing gear, showing the invention applied thereto.

Associated with each wheel, 5 and 6, is an assembly of parts which is identical for each wheel; only the assembly for wheel 6, however, being shown in Fig. 1. This assembly includes a cup-shaped hub cap 26 having an outer portion 27 on which are mounted bell cranks 28 whose weights 29, integrated therewith, swing outwardly in response to the centrifugal force exerted thereon whenever the wheel assembly (6—26—27) is rotated. When not rotating, the weights are held in the positions shown by the action of spring 31 upon collar 32; the inner end of spring 31 abutting the hub-sleeve 33 of the wheel assembly.

Within spring 31 there extends a plunger 36 having a pair of circumferential grooves 38 and 39—the groove 38 being registrable with spring pressed detents 41 when the plunger is pressed inwardly, and the groove 39 being engaged by fingers 40 of cam elements 42 which operatively abut arms 43 of the brake assembly. These arms 43 are mounted, as shown at 46, upon the cup-shaped brake housing 47, the latter being carried by the circular extension 48 of the gear housing 49. Gear housing 49 also carries the outer, or orbital gear 51 of a planetary system whose central, or sun gear 52 is an integral part of the one-way driving means for the hydraulic clutch 56—57—58 of the "fluid flywheel" type that is now in extensive use in automobile transmission systems.

The brake shoes 44 (on the brake arms 43) are movable to engage the inner circular surface 45 of the outer element 56 of the fluid clutch, and said outer element 56 also has a hub portion 61 to receive the screws 62 which carry the planets 63 of the gear train. One of the two electric motors 65 (diagrammatically shown in Fig. 2) drives this gear train of wheel 6, while the other drives the corresponding gear train (not shown) of wheel 5. In each case the drive to the gear train is uni-directional, the structure for this purpose being preferably a roller type clutch in each motor drive, with an outer driving race 66 integrated with extension 67 of the motor armature shaft, and an inner (driven) race 68 as an integral part of a shaft 69 having teeth 52 to constitute the sun gear of the planetary system, heretofore described. Shaft 69 extends into the hub 71 of driven element 58 of the fluid clutch, and is centrally bored to receive one of the rods 14 heretofore described. The hub 71 is slotted for passage therethrough of brake-actuating fingers 40, and extends outward into driving relationship to hub cap 26, to which it is secured by the same screws 70 which hold the hub-sleeve 33, heretofore described. Ball-bearings 74 facilitate relative rotation between elements 57 and 58 of the fluid clutch, and bearings 76 act similarly as between element 58 and shaft 69. The frame tube, or axle, 8 encloses the motor 65 and connects at its inner end with gear housing 49, to support the latter. Fastening means 70' secures part 56 to part 57 of the fluid clutch.

A switch element 81 (Fig. 2) controls the energization of the two motors 65, and may be operated by a governor mechanism so as to move into bridging relationship to a pair of contacts 83 when the aircraft engines decelerate preparatory to descent of the craft. These contacts 83 are shown as adapted to connect source 82 with the motors 65—and also, if desired, with a landing gear motor 85—to produce enerigzation of said motors as the craft begins its descent; the energizing process continuing until the flow of current is interrupted by the action of circuit breaker 90 in moving contact 86 out of engagement with contacts 87 and 88. This will occur as the landing gear reaches fully extended position, that is, at the approximate moment of contact with the ground. The motor driven wheels 6, at that moment, will have been accelerated to, say, 200 R. P. M (see point A on the Fig. 3 diagram) by reason of the drive from motors 65 and the associated reduction gearing, previously described. The ensuing travel of the plane along the landing field runway will accelerate the wheels to, say, 300 R. P. M. (point B on the diagram) and—assuming a proper pre-setting of spring 31, by adjustment of nut 32—the developed centrifugal force will then be effective to move element 36 to the left sufficiently to throw brake shoes 44 into contact with the inner surface 45 of the fluid clutch element 56—57. When this occurs, fluid clutch element 56—57 will begin to act as a fluid brake with respect to fluid clutch element 58, thereby gradually decelerating the said element 58 and the parts which rotate therewith—said parts including member 26 and wheel 6. Wheel 5 will be simultaneously decelerated (portion B to C of the diagram, Fig. 3) by the similar action of the duplicate fluid brake associated therewith. Thus the craft will be brought to a gradual stop.

During the A—B period of wheel acceleration—the motors 65 being then deenergized— clutch member 68 (and the corresponding member of the other wheel assembly) will over-run clutch member 66, thus leaving the motors 65 free to come to rest. After complete stoppage of the craft, the brake actuating cams 42 may be moved back to the inoperative position (shown in Fig. 1) by a pull of the operator exerted on cables 17, whereupon the brake releasing springs (not shown, but see the comparable brake releasing springs 115, 116 in Fig. 2 of Lansing Patent No. 1,973,288) will return brake shoes 44 to the released position shown in Fig. 1. The craft is then ready for its next flight.

During take-off, in order to guard against an automatic re-application of the brake, the rods 14 will be held advanced (that is, in the position to the right of that shown in Fig. 1) by continuous pull on cables 17, or by latching the ends of said cables in the pulled-up position, by suitable latching means, not shown.

Figure 2:
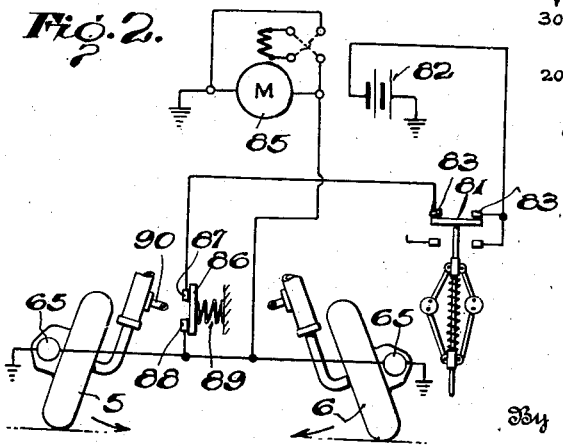
Fig. 2 is a diagram showing the currently preferred electrical control means.
Figure 3:
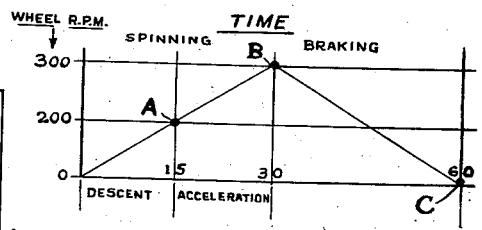
Fig. 3 is a diagram showing the time-speed relationship, and sequence of actions.

The circuit to motors 65 may, of course, be closed and/or opened normally, in lieu of the automatic means shown in Fig. 2.

What is claimed is:

1. In combination with an aircraft wheel, rotating means for said wheel, said rotating means comprising a motor and fluid clutch, means for converting said clutch to a fluid brake for deceleration of the wheel after de-energization of the motor, said converting means including friction elements engageable with a part of said fluid clutch, and speed responsive means for moving said friction elements to engaging position.

2. In an aircraft having a landing gear movable from a position of retraction to a position of full extension, and including a rotatable wheel, means for moving said landing gear, including said wheel, to said position of full extension, rotating means for said wheel, said rotating means comprising a motor and a fluid clutch, means for energizing said motor as the craft prepares to land, and means responsive to a full extension of the landing gear to de-energize said motor.

3. In an aircraft having a landing gear movable from a position of retraction to a position of full extension, and including a rotatable wheel, means for moving said landing gear, including said wheel, to said position of full extension, rotating means for said wheel, said rotating means comprising a motor and a fluid clutch, means responsive to deceleration of the aircraft engines for energizing said motor as the craft prepares to land, and means responsive to a full extension of the landing gear to de-energize said motor.

SIDNEY H. WEBSTER.